Patented Jan. 2, 1945

2,366,189

UNITED STATES PATENT OFFICE 2,366,189

SULPHA-THIAZOLES

William Hiemenz and Paul Setz, Albany, N. Y., assignors to Winthrop Chemical Company, Inc., New York, N. Y., a corporation of New York No Drawing. Application April 18, 1939,
Serial No. 268,525

4 Claims. (Cl. 260—239.6)

This invention relates to sulphanilylamino thiazoles, their salts and process of making the same.

Sulphanilic acid amide, generally known as sulphanilamide and derivatives thereof have proven to be valuable in combating infectious diseases caused by various bacteria, such as streptococci, staphylococci and gonococci. Most of these compounds have shown very little or no efficiency against pneumococci. The present invention leads to preparations which in addition to their anti-streptococcal activity are also valuable therapeutics in the treatment of infections caused by the various types of pneumococci.

The compounds related to this invention possess the following general formula:

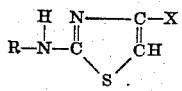

wherein R stands for a radicle selected from the group consisting of the para amino benzene sulphonyl-, the para- lower fatty acid acyl amino benzene sulphonyl- and the para lower alkylamino benzene sulphonyl- radicles, and X stands for a member selected from the group consisting of hydrogen, lower alkyl- and phenyl- groups. Such substances may be produced by reacting compounds of the formula:

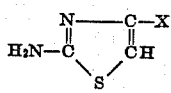

wherein X is defined as above with para lower alkyl, or para lower fatty acid-aminobenzene-sulpho-chlorides in an anhydrous acid-binding solvent. The preferred acid-binding solvents are organic tertiary bases. Examples of such bases are pyridine or quinoline.

The reaction products may be used as such or in cases where p-acyl-aminobenzene-sulphonyl chlorides were used, the acyl group may if desired be saponified to yield p-aminobenzene-sulphanyl thiazoles.

The following examples will further illustrate the nature of our invention, which however is not restricted to these specified examples.

*Example 1—2-sulphanilylaminothiazole*

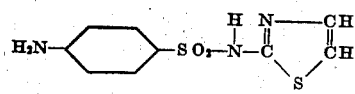

70 grams of p-acetylaminobenzene sulphochloride are dissolved in 200 cc. dry pyridine. While this solution is cooled with ice, 30 grams of 2-aminothiazole are added and the mixture is allowed to stand at room temperature for 24 hours. Then the mixture is poured upon a mixture of ice and sulphuric acid. The 2-(aceto-sulphanilyl-amino)-thiazole precipitates. It is filtered and washed with water. If recrystallized from dilute alcohol, it melts at 250° C. Other acylamino compounds may be employed in place of the acetylamino product. For instance the compounds containing the acyl radicle of propionic or butyric acid may be employed instead of the acetyl compound with the result that similar products are obtained.

The 2-(aceto-sulphanilyl-amino)-thiazole is saponified by boiling it with a mixture of 300 cc. water and 200 cc. conc. hydrochloric acid until solution occurs. The solution is decolorized by treating it with charcoal. When the solution is neutralized with sodium hydroxide, the 2-(sulphanilyl-amino)-thiazole crystallizes out. If recrystallized from 85% alcohol, it has a melting point of 195–196° C. Its sodium salt is prepared by dissolving one mol sulphanilyl-amino-thiazole in 1 liter normal sodium hydroxide solution. On standing at low temperature, the salt crystallizes in colorless plates. The salt is fairly soluble in water, slightly soluble in alcohol, insoluble in ether and benzene. In a similar way, other alkali or alkali-earth metal salts may be obtained.

*Example 2—2-sulphanilylamino-4-methyl thiazole*

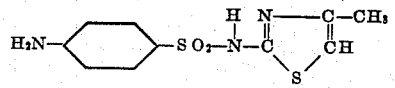

120 grams p-acetylaminobenzene sulphochloride are dissolved in 400 cc. pyridine. While this solution is cooled with ice 60 grams of freshly distilled 2-amino-4-methyl thiazole are added and the mixture is then allowed to stand at room temperature for 24 hours. The mixture is then poured upon a mixture of ice and sulphuric acid. The 2-(p-acetosulphanilyl-amino)-4-methyl thiazole precipitates. Recrystallized from acetone, it melts at 250° C., under decomposition.

The aceto compound is saponified by boiling it for 40 minutes with a mixture of 200 cc. HCl conc. and 500 cc. 50% alcohol. The 2-(p-sulphanilyl-amino)-4-methyl thiazole is precipitated out of the acid solution by neutralization with sodium hydroxide. If recrystallized from 75% alcohol it has a melting point of 240–241° C. Products possessing similar properties can be obtained by employing ethyl, propyl, butyl, amyl, etc. alkyl-substituted thiazole, instead of the methyl thiazole. Alkali and alkali-earth metal salts of these compounds can be obtained in a similar way as described in Example 1.

Example 3—2-sulphanilylamino-4-phenyl thiazole

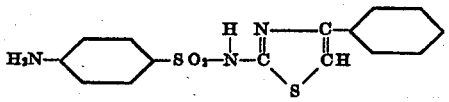

53 grams of p-acetylaminobenzene sulphochloride are dissolved in 200 cc. dry pyridine. While this solution is cooled with ice, 40 grams 2-amino-4-phenyl thiazole are added and the mixture is then allowed to stand at room temperature for 24 hours. The mixture is then poured upon a mixture of ice and sulphuric acid. The 2-(p-acetosulphanilylamino)-4-phenyl thiazole precipitates. Recrystallized from 80% alcohol, it melts at 231–233° C.

The aceto compound is saponified by boiling it for 30 minutes with a mixture of 150 cc. conc. hydrochloric acid and 500 cc. 50% alcohol. While the solution is still boiling, the hydrochloride of the 2-(p-sulphanilylamino)-4-phenyl thiazole crystallizes out. After the solution has been cooled down with ice, the hydrochloride is filtered off, dissolved in sodium hydroxide solution and the 2-(p-sulphanilyl-amino)-4-phenyl thiazole precipitated with acetic acid. If recrystallized from 80% alcohol or dilute acetone it melts at 192–193° C.

As used in this specification and in the following claims the expressions "lower fatty acid" and "lower alkyl" refer to those fatty acids and those alkyl groups which contain from 1–8 carbon atoms.

We claim:

1. The new therapeutic product which is represented by the following formula:

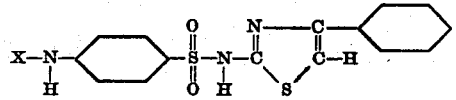

in which X is a member of the class consisting of hydrogen and a lower acyl group.

2. The new compound 2-(p-acetylamino-benzene-sulphonyl-amido)-4-phenyl thiazol, which is represented by the following formula:

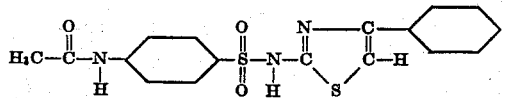

said compound melting at approximately 231–233° C.

3. The new compound 2-(p-amino-benezene-sulphonyl-amido)-4-phenyl thiazol, which is represented by the following formula:

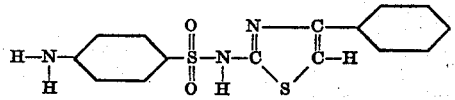

said compound melting at approximately 192–193° C.

4. The process of producing the product set forth in claim 2, which consists in reacting 2-amino-4-phenyl thiazol with p-acetylamino-benzene-sulphonyl chloride.

WILLIAM HIEMENZ.
PAUL SETZ.